H. G. BLEY.
DIRIGIBLE LIGHT.
APPLICATION FILED JULY 11, 1919.

1,349,658.

Patented Aug. 17, 1920.
2 SHEETS—SHEET 1.

Inventor.
Herbert G. Bley
by
his Attorney.

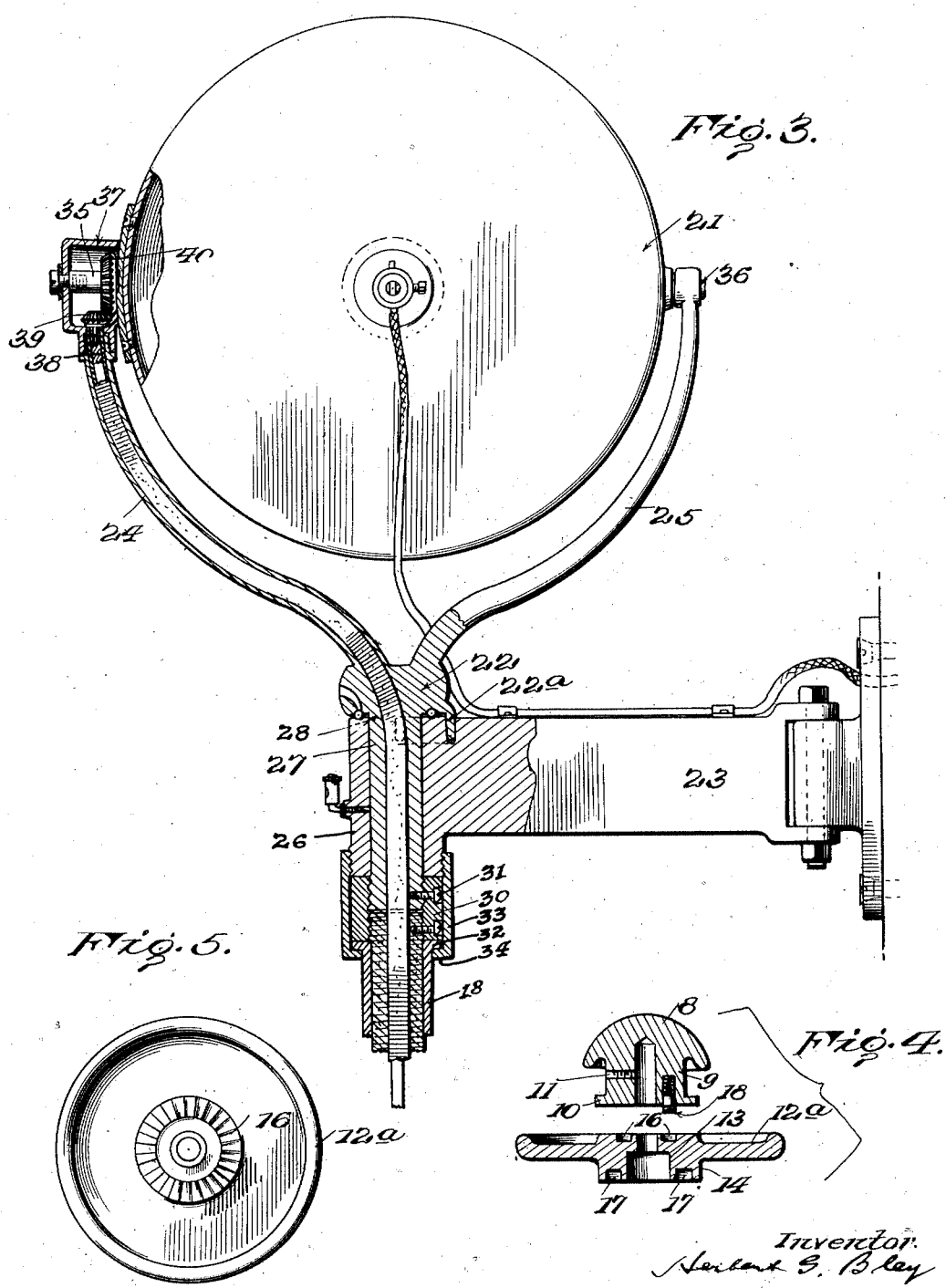

UNITED STATES PATENT OFFICE.

HERBERT G. BLEY, OF WATERLOO, IOWA.

DIRIGIBLE LIGHT.

1,349,658.   Specification of Letters Patent.   Patented Aug. 17, 1920.

Application filed July 11, 1919. Serial No. 310,120.

*To all whom it may concern:*

Be it known that I, HERBERT G. BLEY, a citizen of the United States, residing at Waterloo, in the county of Black Hawk and State of Iowa, have invented certain new and useful Improvements in Dirigible Lights, of which the following is a specification.

This invention relates to dirigible spotlights or headlights, and is especially adapted for use on automobiles, although it is also applicable to any other kind of vehicles, boats, etc.

The primary object of the invention is the provision of means for mounting the light so that its rays may be easily directed to any desired point. Ordinarily spotlights are located adjacent or on the windshield, in reach of the operator, but it is necessary for him to place his hand thereon in order to direct the rays thereof as desired. It is the purpose of this invention to eliminate this necessity, and also to provide means whereby the direction of the rays may be shifted laterally or vertically.

In the accompanying drawings forming a part of this specification,

Fig. 3 is a view, partly in section of the mechanism and associated support.

Fig. 4 is a composite view of the operating wheel and knob.

Fig. 5 is a plan view of an operating wheel.

Figure 1:
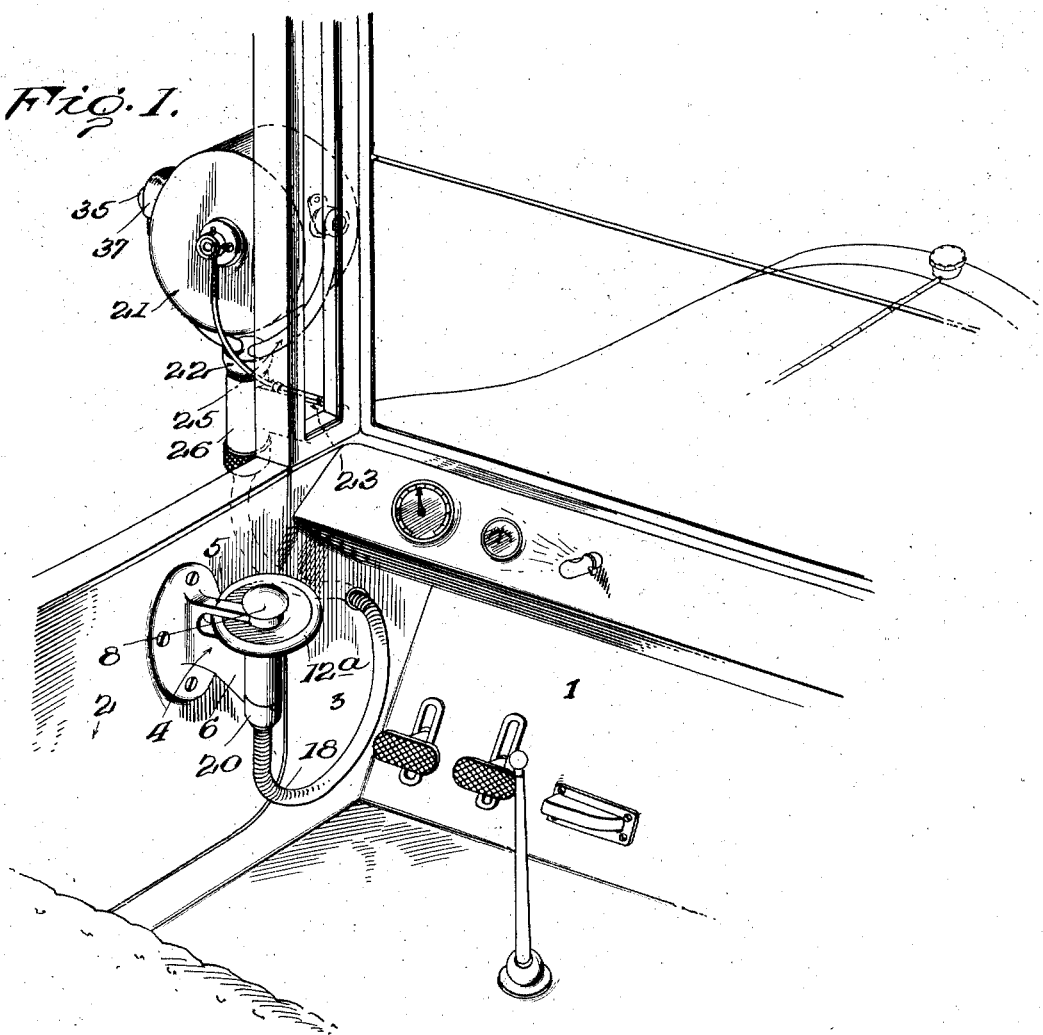
Figure 1 is a perspective view showing the spotlight attached to an automobile.
Figure 2:
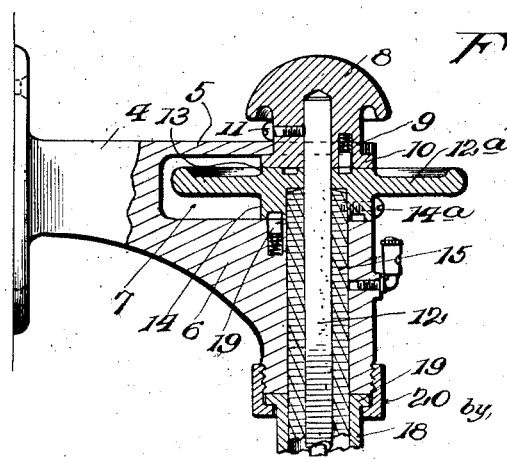
Fig. 2 is a sectional detail somewhat enlarged, showing the controls.

Referring especially to the drawings, 1 indicates the dash of an automobile, and 2 the door thereof. It is obvious that this automobile may be either of the open or closed type. Mounted upon the door 2, or on the body 3 between the door and the dash, is a bracket 4, more clearly shown in Fig. 2. The bracket 4 is provided with two arms 5 and 6, forming between them a slot 7, as shown in Fig. 2.

A knob 8 is mounted on top of the arm 5, said knob being provided with a shank 9 extending downwardly through an aperture in said arm. The shank 9 is provided with a peripheral flange 10, for a purpose to be hereinafter described.

Centrally fastened to the knob 8, by screws 11, or otherwise, is a flexible shaft 12, which extends downwardly through the arm 6 of the bracket 4, as shown.

Mounted in the slot 7, concentric with the knob 8, is a wheel $12^a$, having hub portions 13 and 14, for a purpose to be hereinafter described. A flexible shaft 15 surrounds the shaft 12, and extends upwardly between the hub portions 14 of the wheel $12^a$, and is secured thereto by a screw $14^a$, or otherwise.

On the hub 13 of the wheel $12^a$, is a circular row of ratchet teeth 16, see Fig. 5, and a similar row of teeth 17 is provided in the hub 14. The notches of the teeth in the hub 14 are deeper than those in the hub 13, as shown in Fig. 4. The flange 10 of the knob 8 carries a spring-actuated dog 18, adapted for coöperative engagement with the teeth 16 on the wheel $12^a$, and a spring-actuated dog 19, carried by the arm 6, is adapted for engagement with the teeth 17 on said wheel. Since the teeth 17 are deeper than the teeth 16, it necessarily follows that, while the knob 8 may be turned without turning the wheel $12^a$, any revolution of said wheel will revolve the knob.

A housing 18 covers the shafts 12 and 15. Said housing is provided with a peripheral flange 19 which is contacted by a coupling nut 20, screw threaded upon the lower end of the arm 6, as clearly shown in Fig. 2.

The spotlight 21 is mounted on a light bracket 22, carried by a supporting bracket 23, which may be pivotally or rigidly secured to a convenient part of the vehicle. The bracket 22 is bifurcated to provide two arms 24 and 25, one of said arms, here shown at 24, being hollowed to permit of the passage therethrough of the shaft 12, as shown in Fig. 3.

The supporting bracket 23 is provided with a downwardly extending, apertured, externally screw-threaded sleeve 26, as clearly illustrated in Fig. 3, and the light bracket 22 carries a post 27 which rotatably fits into the aperture in said sleeve 26, the lower end of said post being screw threaded as shown. The spreading brace 28 of the bracket 22 is grooved to form a raceway for bearings 29, and the top wall of the sleeve 26 is similarly grooved to complete the raceway for said bearings.

The upper end of the flexible shaft 15 is screw threaded and is secured to the post 27 by means of a coupling nut 30, and screws, bolts, or pins 31 are provided to prevent disconnection when the shaft is turned. The upper end of the housing 18 is provided with a peripheral flange 32, and a coupling nut 33, for the housing, is in screw-threaded engagement with the lower end of the sleeve 26, said nut 33 having a flange 34 which engages the flange 32 and holds the housing in its operative position. This construction is clearly shown in Fig. 3.

As before stated, the smaller or inner flexible shaft extends through the hollow arm 24, of the bracket 22. The lamp 21 is pivotally mounted on the ends of the arms 24, 25, by means of stub shafts 35 and 36, having bearings in trunnions formed in said arms. The upper end of the arm 24 is provided with a housing 27, apertured at the bottom for the reception of the post 38 of a beveled gear 39, the shaft 12 being secured to said post 38, in any suitable manner whereby rotation of the shaft will revolve the gear 39. Mounted on the stub shaft 35 is a gear wheel 40 which meshes with the gear 39 carried by the shaft 12. It is obvious therefore that rotation of the gear 39 will cause a rotation of the lamp 21 on its pivots.

From the foregoing the operation of my device should be perfectly clear. Assume that the light is mounted on a moving automobile and that the operator desires to direct the rays toward a definite object. The operating mechanism is immediately adjacent one of his hands and it is not necessary for him to lean forwardly over the steering wheel (not shown) to change the direction of the rays of the light 21. He first manipulates the wheel 12ª to turn the lamp 21 laterally to the desired position. During rotation of the wheel 12ª, the shaft 15 is of course rotated, since it is secured thereto, and, since the shaft 15 is secured to the post 27, the bracket 22 will be swung laterally around on the bearings 29. When the desired lateral plane is attained the wheel is held stationary, against vibratory movement, by the dog 19 entering the recesses formed by the deep teeth 17.

To attain the desired vertical inclination of the lamp 21, the knob 8 is rotated, causing the shaft 12 to rotate, and effecting an upward or downward inclination of the lamp 21, by means of the meshing gears 39 and 40. The dog 18 locks the knob 8 at the desired point.

The dogs 18 and 19, and their controlling springs, are so constructed and designed with respect to the size and depth of the teeth 16 and 17, and the resistance offered to rotation of the shafts 12 and 15, that rotation of the knob 8 will not actuate the wheel 12ª, but, by turning the wheel 12ª the knob 8 is also revolved. Hence the lateral position of the lamp 21 is first attained by rotating the wheel 12ª.

From the foregoing it will be obvious that I have designed means for quickly and positively attaining the desired movement of the lamp 21, without the necessity of the operator shifting his position. If desirable an oil cup may be located in the sleeve 26, and another in the arm 6, as shown. It will be noted that in the construction shown, vertical movement of the bracket 22 is impossible, because of the enlarged base 22, and the engagement of the nut 30 with the lower face of the sleeve 26. To positively limit the swing of the bracket 22, the base 28 thereof is provided with a downwardly projecting stub 22ª, the lower end of which is seated in a groove provided in the top surface of the sleeve 26, as shown in Fig. 3. The groove extends only partially around this surface of the sleeve and the engagement of the stub 22ª with the ends of the groove prevents too great a swing of the light and a consequent rupture of the electrical connections.

It is to be understood that, while I have shown and described this invention as applied to a spotlight attached to an automobile, it is equally applicable to headlights of other road or track vehicles, and also to lights carried by boats or air crafts of all descriptions.

Modifications of the invention may be suggested to those skilled in the art, but I desire to secure as my invention all such embodiments as fall fairly within the scope of the appended claims.

I claim:

1. In combination, a pivoted light, a rotatable shaft adapted to shift the light in one plane, a second rotatable shaft extending through said first mentioned shaft and beyond the end thereof and adapted to shift the light in another plane, means for manually actuating one shaft and independent means for manually actuating the other shaft, and mechanism located between said means whereby the interior shaft is yieldingly held against undesired rotation.

2. In combination, a pivoted light, a rotatable shaft adapted to shift the light in one plane, a second rotatable shaft extending through said first mentioned shaft and beyond the end thereof and adapted to shift the light in another plane, means for manually actuating one shaft and independent means for manually actuating the other shaft, a support for said shafts, and cooperating mechanisms carried by the exterior shaft and said support whereby said shaft is yieldingly held against undesired rotation.

3. An apparatus of the class described comprising, in combination with a vehicle, a light pivotally mounted thereon, a flexible shaft connected to the light and adapted to swing it in one plane, a second flexible shaft connected to the light and adapted to swing it in another plane, a hand knob for actuating one shaft, a hand wheel for actuating the other shaft, a support for said knob and wheel, pawl and ratchet mechanism carried by said knob and wheel, whereby one of the shafts may be resiliently locked against rotation, and similar mechanism carried by the wheel and support for resiliently locking the other shaft against rotation, substantially as described.

4. An apparatus of the class described comprising, in combination with a vehicle, a light pivotally mounted thereon, a flexible shaft adapted to swing the light in one plane, a second flexible shaft adapted to swing the light in another plane, a knob for actuating one shaft, a wheel for actuating the other shaft, a support for said knob and wheel, a ratchet mechanism between the knob and wheel, and a stronger ratchet mechanism between the wheel and support, whereby rotation of the knob will not cause a rotation of the wheel but rotation of the wheel may rotate the knob, substantially as described.

5. An apparatus of the class described comprising, in combination with a vehicle, a bifurcated, rotatable bracket carried thereby, a light pivotally mounted on the bracket, stub-shafts connecting the light to the bifurcations of the bracket, a gear on one of said stub-shafts, a flexible shaft extending through one of the bifurcations of the bracket and carrying a gear adapted for coöperative engagement with the gear on the stub-shaft, whereby actuation of the flexible shaft may actuate the light in a vertical plane, a second flexible shaft surrounding said first-named flexible shaft and connected rigidly to the bracket and adapted, upon actuation, to rotate the bracket and light in a lateral plane, and means for rotating said flexible shafts independently.

6. An apparatus of the class described comprising a bracket, a light supporting bracket carried thereby and rotatable with respect thereto, means for rotating said light supporting bracket, and coöperating means on said brackets limiting the rotative movement of the light supporting bracket, said means comprising a projection carried by one bracket, adapted for reception in an arcuate groove formed in the other bracket and for engagement with the end walls of said groove.

7. An apparatus of the class described comprising a bracket provided with a vertical, tubular extension, a light-supporting bracket carrying a post fitting into said extension, a pivoted light carried by the light-supporting bracket, a flexible shaft extending through said post and geared to the light, whereby actuation of the shaft will shift the light in a vertical plane, a second flexible shaft surrounding the first mentioned shaft and secured to the lower end of the post, and adapted, upon actuation, to shift the light-supporting bracket in a lateral plane, and means for actuating said shafts.

In testimony whereof I affix my signature in presence of two witnesses.

HERBERT G. BLEY.

Witnesses:
  H. O. ARTHUR,
  F. O. HERFURTH.